T. S. McGEHEE.
VEHICLE WHEEL TIRE.
APPLICATION FILED JAN. 27, 1917.

1,231,397.

Patented June 26, 1917.

WITNESSES

INVENTOR
T. S. McGehee
BY Victor J. Evans
ATTORNEY

UNITED STATES PATENT OFFICE.

TOM S. McGEHEE, OF LOCKNEY, TEXAS.

VEHICLE-WHEEL TIRE.

1,231,397.  Specification of Letters Patent. Patented June 26, 1917.

Application filed January 27, 1917. Serial No. 144,895.

*To all whom it may concern:*

Be it known that I, Tom S. McGehee, a citizen of the United States, residing at Lockney, in the county of Floyd and State of Texas, have invented new and useful Improvements in Vehicle-Wheel Tires, of which the following is a specification.

This invention relates to vehicle wheel tires, the broad object in view being to provide a substantially all metal or sheet steel tire to take the place of the present day pneumatic tire and which will embody the necessary resiliency to absorb all necessary road shocks and vibrations, entirely eliminating all the usual troubles such as punctures and blow-outs.

More specifically stated, the object of the invention is to produce a tire composed mainly of spring steel and embodying the conjoint use of an annular resilient supporting member, an annular resilient tread member, and tensioning means for increasing or diminishing the yielding or spring properties of the supporting member, whereby the resiliency and yielding properties of the complete tire may be regulated in accordance with the load to be imposed thereon.

With the above and other objects in view, the invention consists in the novel construction, combination and arrangement of parts, herein described, illustrated and claimed.

In the accompanying drawing:—

Figure 1:
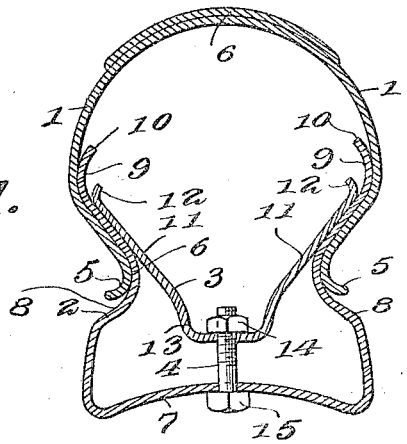
Figure 1 is a cross section through the improved tire.
Figure 2:
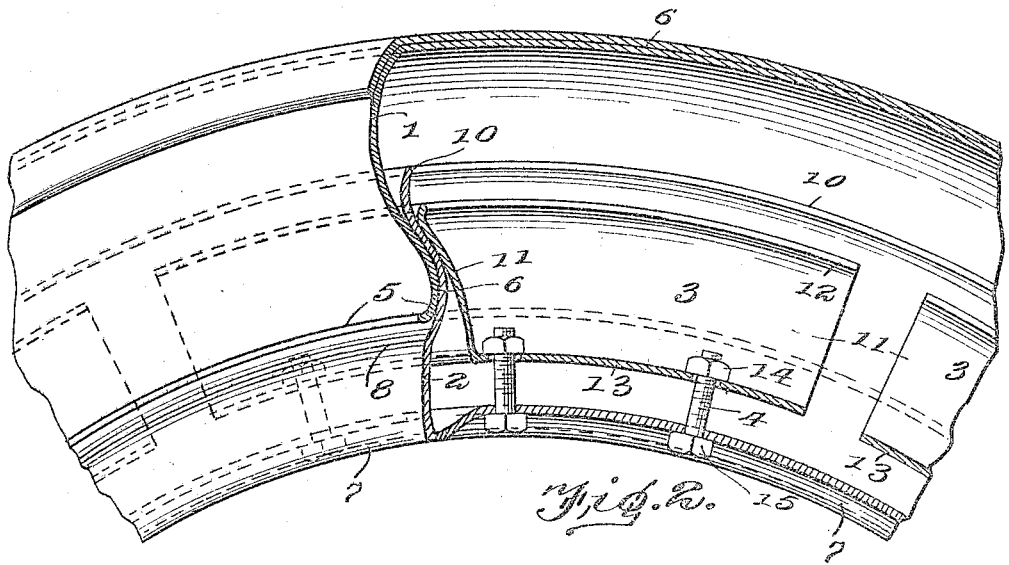
Fig. 2 is a fragmentary longitudinal section partly in elevation, of the same.
Figure 3:
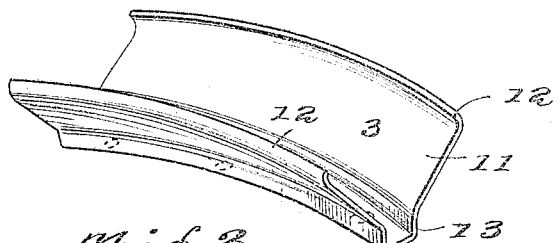
Fig. 3 is a detail perspective view of one of the tensioning members or spreaders.

The tire contemplated in this invention comprises a resilient tread member 1, a resilient tread supporting member 2, and an annular series of tensioning members or spreaders 3 together with tensioning bolts 4 or the equivalent thereof for adjusting the tensioning members 3.

The tread member 1 which is preferably endless or in the form of a complete annulus, is greater than a semi-circle in cross section and has the marginal or edge portions thereof curved outwardly as shown at 5 to provide rounded inner faces 6 adapted to ride against opposite sides of the supporting member as shown in Fig. 1. The tread member 1 may be reinforced by a tread strip 6 of any desired thickness and of any suitable material, secured thereto in any approved manner.

The supporting member 2 which is also preferably endless or in the form of a complete annulus comprises an arched base portion 7 in order to provide clearance for the heads of the tensioning bolts hereinafter referred to so that the heads of the bolts may be contained between the base of the supporting member 2 and the felly or fixed rim of a vehicle wheel. The opposite side portions of the supporting member 2 are curved inwardly toward each other to embrace from the inner side the outwardly curved portions of the tread member 1 and also to provide rounded bearing surfaces 8 against which the bearing surfaces 6 of the tread member slide in a direction substantially radial to the center of the wheel at the top and bottom thereof. The marginal portions of the tread member 2 are then curved in the reverse direction as shown at 9 so as to ride against the inner surfaces of the tread member 1 and are finally curved abruptly inward as shown at 10 so as not to injure the tread member 1 as the members 1 and 2 move with a yielding action in relation to each other.

Each of the tensioning or spreading members 3 comprises outwardly diverging portions 11 which bear against the inner surfaces of the side portions of the supporting member 2 and have their extreme edges curved abruptly inward as indicated at 12 to avoid scraping against the corresponding inner surfaces of the supporting member 2. The portions 11 of the tensioning member 3 are connected by a channeled or gutter-like portion 13 in which are placed nuts 14 threaded upon the tensioning bolts 4 above referred to, the heads 15 of said bolts being arranged beneath the arched base portion 7 of the supporting member 2, all as clearly shown in the drawings.

From the foregoing description taken in connection with the accompanying drawings, it will now be understood that the supporting member resiliently supports the tread member and both of said members coöperate to produce the necessary resiliency of the tire, the marginal portions of the supporting member coacting with the tread member, and the marginal portions of the tread member coacting with the divergent portions of the supporting member. By preference several bolts 4 will be used in connection with each spreading or tensioning member 3, and by tightening said bolts, the members 3 act as wedges to yieldably spread apart the side portions of the supporting member 2. In this way the tire may be regulated to accommodate different loads.

I claim:—

1. A vehicle wheel tire, comprising a sheet metal resilient supporting member, and a tread member partially embracing said supporting member, the tread member having its marginal portions curved in cross section so as to ride against correspondingly curved portions of the supporting member, and the supporting member having its marginal portions curved in such manner as to ride against correspondingly curved portions of the tread member.

2. A vehicle wheel tire, comprising a sheet metal resilient supporting member, and a tread member partially embracing said supporting member, the tread member having its marginal portions curved in cross section so as to ride against correspondingly curved portions of the supporting member, the supporting member having its marginal portions curved in such manner as to ride against correspondingly curved portions of the tread member, and means for tensioning the marginal portions of said supporting member.

3. A vehicle wheel tire, comprising a sheet metal resilient supporting member, and a tread member partially embracing said supporting member, the tread member having its marginal portions curved in cross section so as to ride against correspondingly curved portions of the supporting member, the supporting member having its marginal portions curved in such manner as to ride against correspondingly curved portions of the tread member, and means for tensioning the marginal portions of said supporting member, said tensioning means comprising an annular series of spreading members having divergent marginal portions which bear against the inner surfaces of the marginal portions of the supporting member.

4. A vehicle wheel tire, comprising a sheet metal resilient supporting member, and a tread member partially embracing said supporting member, the tread member having its marginal portions curved in cross section so as to ride against correspondingly curved portions of the supporting member, the supporting member having its marginal portions curved in such manner as to ride against correspondingly curved portions of the tread member, means for tensioning the marginal portions of said supporting member, said tensioning means comprising an annular series of spreading members having divergent marginal portions which bear against the inner surfaces of the marginal portions of the supporting member, and means for adjusting said spreading members so as to resist to a greater or less degree the resilient action of the marginal portions of the supporting member.

In testimony whereof I affix my signature.

TOM S. McGEHEE.

Copies of this patent may be obtained for five cents each, by addressing the "Commissioner of Patents, Washington, D. C."